(12) United States Patent
Morgana et al.

(10) Patent No.: US 8,186,593 B2
(45) Date of Patent: May 29, 2012

(54) COLORED BARCODE DECODING

(75) Inventors: Stephen C. Morgana, Rochester, NY (US); R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 731 days.

(21) Appl. No.: 12/181,722

(22) Filed: Jul. 29, 2008

(65) Prior Publication Data
US 2010/0025472 A1 Feb. 4, 2010

(51) Int. Cl.
G06K 19/08 (2006.01)
(52) U.S. Cl. .............. 235/462.04; 235/462.09
(58) Field of Classification Search ............ 235/462.04, 235/462.07, 462.09–11, 462.25
See application file for complete search history.

(56) References Cited

U.S. PATENT DOCUMENTS

| | | | |
|---|---|---|---|
| 5,519,200 A * | 5/1996 | Williams | 235/487 |
| 6,457,651 B2 * | 10/2002 | Paul et al. | 235/494 |
| 2002/0190520 A1 | 12/2002 | Garross et al. | |
| 2003/0121984 A1 | 7/2003 | Pinchen et al. | |
| 2007/0053004 A1 | 3/2007 | Calaway | |
| 2008/0151280 A1 | 6/2008 | Kamijo et al. | |
| 2009/0166425 A1 * | 7/2009 | Ariyoshi et al. | 235/462.41 |

FOREIGN PATENT DOCUMENTS

| | | |
|---|---|---|
| DE | 10149265 | 4/2003 |
| EP | 1318486 | 6/2003 |
| EP | 660270 | 12/2004 |
| GB | 2383878 | 7/2003 |
| GB | 2399669 | 9/2004 |
| WO | WO03032243 | 4/2003 |
| WO | WO03049047 | 6/2003 |
| WO | WO04000559 | 12/2003 |

* cited by examiner

Primary Examiner — Daniel St.Cyr
(74) Attorney, Agent, or Firm — Fay Sharpe LLP

(57) ABSTRACT

In an exemplary embodiment, a method is employed to read an overprinted barcode. An RGB pixel map is obtained from an overprinted color barcode that contains a plurality of disparate colors. A pixel map is allocated for each of the colors detected and each pixel is classified in the one or more pixel maps according to color. One or more barcodes are extracted from the overprinted barcode that correlates to each color detected. Each of the extracted barcodes are then filtered, decoded and read.

15 Claims, 5 Drawing Sheets

COLORED BARCODE DECODING

BACKGROUND

The present exemplary embodiments relate to barcode placement and decoding. They find particular application in conjunction with colored barcodes. In one embodiment, a plurality of colored barcodes are overprinted in the same area to store a greater amount of information within a one dimensional barcode space. However, it is to be appreciated that the present exemplary embodiments are also amenable to other like applications.

Barcodes are employed in a plurality of industries to provide an efficient and accurate means of inventory control. Generally, the barcode contains a plurality of bars and spaces within a field to designate a particular message. A barcode symbol typically consists of five parts: a first quiet zone, a start character, one or more data characters (including an optional check character), a stop character, and a second quiet zone. The message generally includes numbers and/or letters that are related to the product or device upon which the barcode is placed. Such bars can be read by a barcode reader or scanner to discern the information contained therein.

The mapping between a message and a barcode is referred to as a symbology. The specification of a symbology includes encoding of one or more digits and/or characters in the message as well as the start marker and the stop marker into bars and space. The quiet zone is generally required before and after the barcode as well as computation of the check character to insure the code was read correctly. Some symbologies utilize interleaving, wherein the first character is encoded utilizing black bars of varying width. The second character is then encoded, by varying the width of the white spaces between these bars. Thus, characters are encoded in pairs over the same section of the barcode as these one dimensional barcodes are printed in a single color (e.g. black). A barcode reader is then utilized to read the code.

Conventionally, readers employ a light output that is sensitive to the reflections from line and space thickness variation. The reader translates the reflected light into digital data that is transferred to a computer for immediate action or storage. One dimensional barcodes are limited in the amount of information stored therein by the size of the barcode. Such size can be dictated by available footprint on a product and/or container utilized therewith. As there are size restrictions for barcode size and information stored therein, there is a need for systems and methods to store a greater amount of information within a single barcode footprint.

BRIEF DESCRIPTION

In one aspect, a method is employed to read an overprinted barcode. An RGB pixel map is obtained from an overprinted color barcode that contains a plurality of disparate colors. A pixel map is allocated for each of the colors detected and each pixel is classified in the one or more pixel maps according to color. One or more barcodes are extracted from the overprinted barcode that correlates to each color detected. Each of the extracted barcodes are then filtered, decoded and read.

In another aspect, a system decodes an overprinted barcode. A barcode intake interface receives a character string and a pixel map classifier classifies pixels associated with the barcode created from the character string. A pixel location identifier identifies the pixels classified by the pixel map classifier and a barcode extractor extracts two or more disparate color barcodes from the overprinted barcode. A decoding element decodes each of the barcodes extracted from the overprinted barcode.

In yet another aspect, a method is utilized to overprint two or more barcodes within a one dimensional barcode space. A character string is created and the information contained within the character string is evaluated. A one-dimensional barcode symbology is selected to map the character string into a predetermined barcode. The amount of disparate barcodes are selected to map to the string and a unique color is selected for each barcode. The disparate barcodes are overprinted into a one-dimensional barcode space.

DETAILED DESCRIPTION

Figure 1:
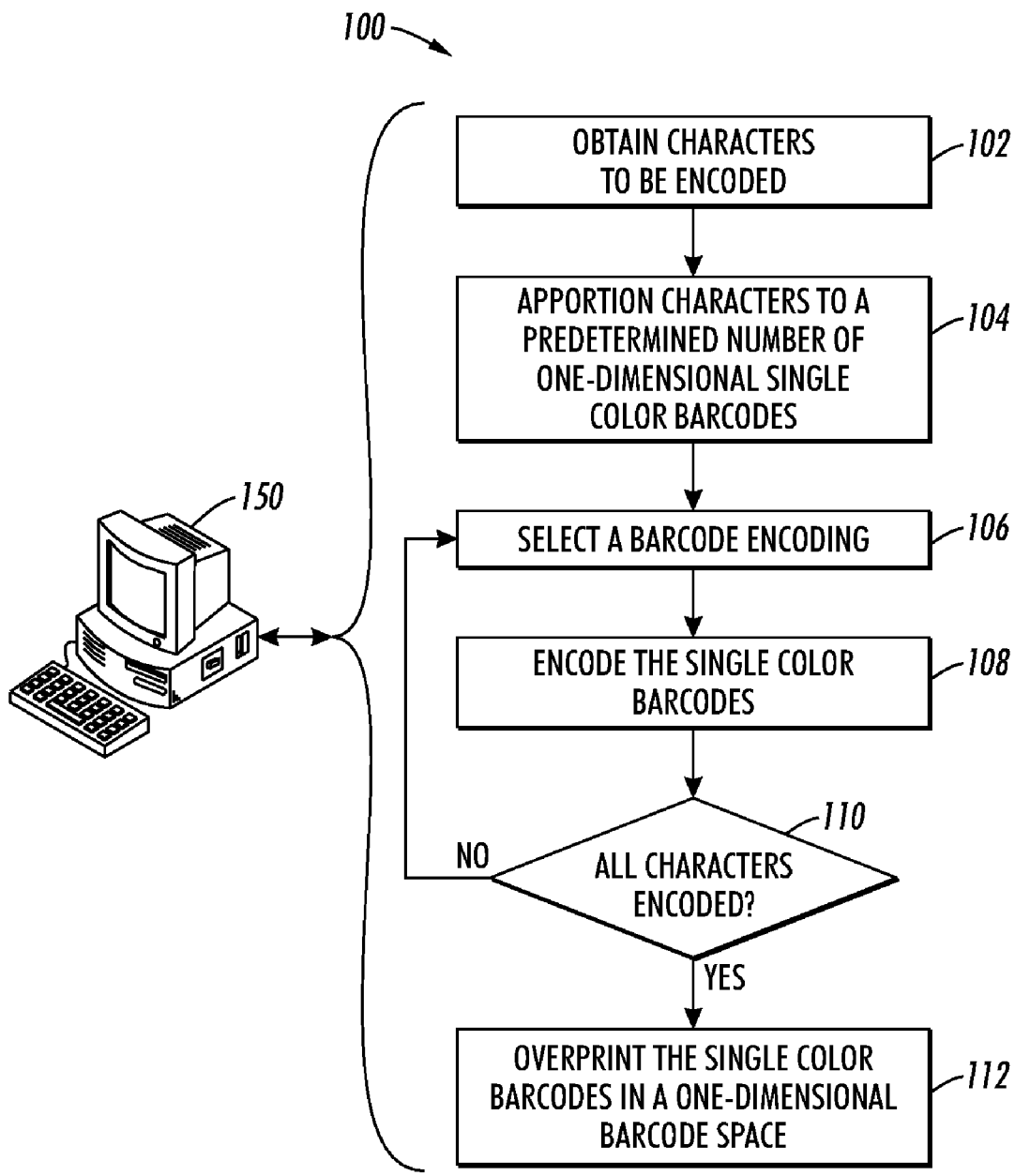
FIG. 1 is a methodology to overprint a colored barcode, in accordance with an exemplary embodiment.

FIG. 1 illustrates a methodology 100 to overprint multiple disparate barcodes in a one-dimensional barcode space. As discussed herein, a one-dimensional barcode space is a footprint occupied by a one-dimensional barcode on a surface utilizing substantially any symbology. At 102, a character string is created. The character string can include substantially any number of letters, numbers and/or symbols that represent some sort of information. For example, the character string can be indicative of a manufacturing date, facility, a lot code, a serial number, etc. The character string can be utilized for product origin tracking, part numbers, manufacturing lots etc. to provide information relevant to the product upon which a barcode is placed.

At reference numeral 104, the amount of information in the character string is evaluated. As the number of characters stored in a barcode may be limited, it is necessary to determine the amount of information contained in the character string such that an appropriate number of disparate barcodes can be utilized. At 106, a one-dimensional barcode symbology is selected. Such one dimensional barcode symbology can include a Plessey, a U.P.C., a Codabar, a Code 11, a Pharmacode, a POSTNET, a PostBar, etc. The selection of the barcode symbology can be related to substantially any factor such as geographic location, marking standards, institutional protocols, available footprint size, etc.

Regardless of the one-dimensional barcode symbology selected, at 108, a determination is made as to the amount of disparate barcodes required to map the character string. This determination is based at least in part upon the size limitations of the barcode, the footprint available, and the type of symbology selected. For example, three disparate barcodes can be selected for a character string that contains eighty-four characters, wherein each barcode stores twenty-eight characters.

At 110, a unique color is selected for each of the barcodes. Continuing with the above example, each of the three disparate barcodes can be assigned a particular color, such as cyan, magenta, and yellow. Such color selection can be based at least in part upon the color limitations of a printing device, user preference, and/or constraints associated with decoding the selected barcode symbology. Once the color selection for each of the disparate bar codes is complete, at 112, the disparate barcodes are overprinted in a one dimensional barcode space in conformance with the symbology selected. In one example, each of the disparate colors can be overprinted in a single one-dimensional barcode. In another example, each of the disparate colors can be printed offset from each other to follow the standards of the one-dimensional barcode. In either case each of the disparate barcodes is printed in substantially the same location to facilitate the subsequent extraction and decoding of each of the disparate barcodes representative of the character string.

It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

A computer 150 illustrates one possible hardware configuration to support the systems and methods described herein, including the method 100 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 150 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 150 can further include a hard disk drive, a magnetic disk drive, e.g., to read from or write to a removable disk, and an optical disk drive, e.g., for reading a CD-ROM disk or to read from or write to other optical media. The computer 150 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 150 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 150 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 150 via any wireless or hard wire protocol and/or standard.

The computer 150 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
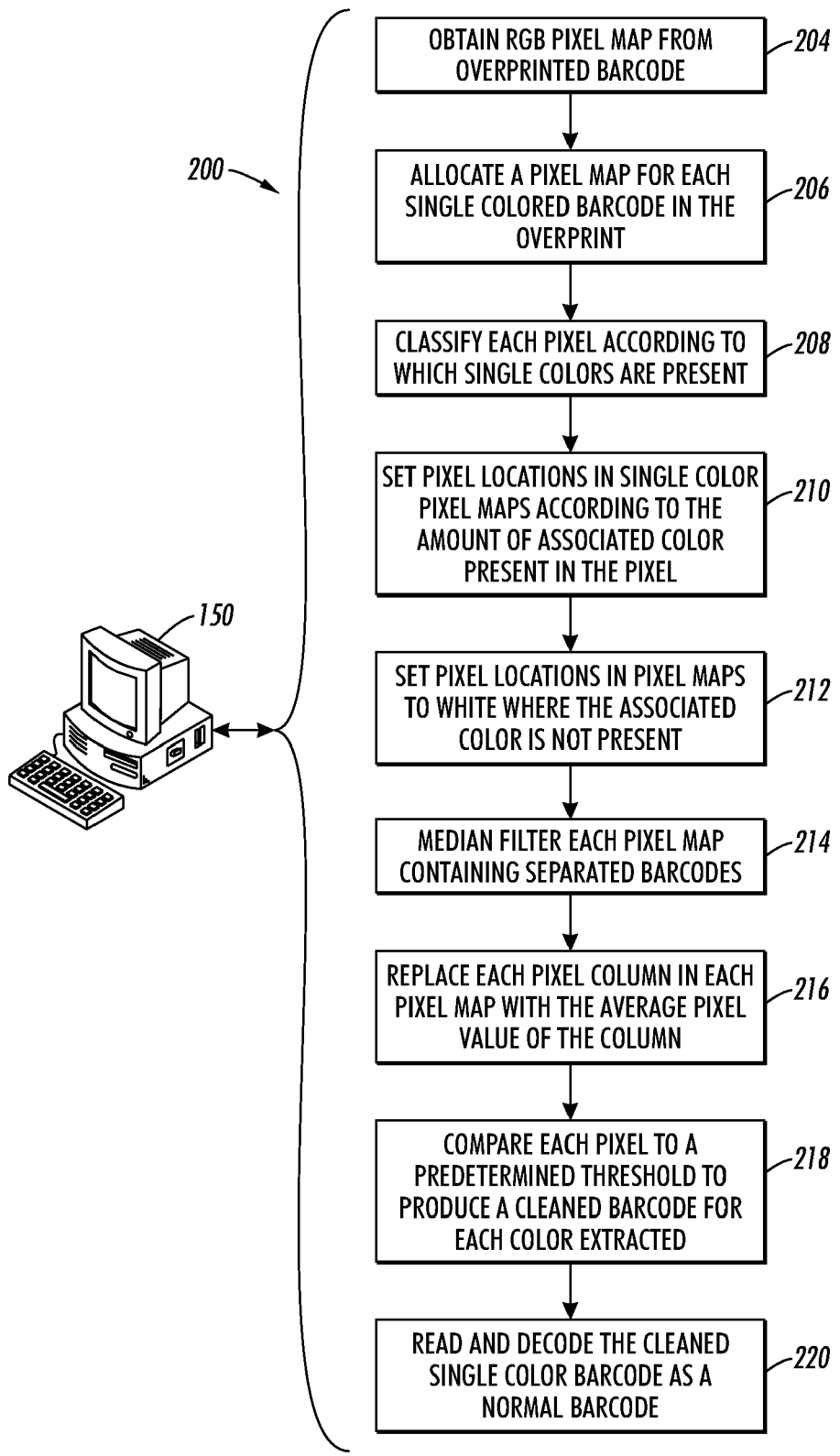
FIG. 2 is a methodology to read and decode an overprinted barcode, in accordance with an exemplary embodiment.

FIG. 2 illustrates a methodology 200 utilized to read and decode barcodes that are extracted from the overprinted one-dimensional barcode created from the methodology 100. At 204, an RGB pixel map is obtained from the overprinted barcode. Such pixel map identifies each of the colors that are located within the overprinted barcode for extraction. An RGB scanner can be utilized to read substantially any color utilized to create each of the overprinted barcodes. Such colors include cyan, magenta, yellow, the secondary mixtures red, green, blue, paper white, and mid-gray. Once each of the colors is obtained, at 206, a pixel map is allocated for each color detected. It is to be appreciated that the possible different colors created is a function of the number of disparate barcodes utilized. For example, if three colors are utilized, a total of eight possible different colors can be created based on the location of each of the disparately colored barcodes in relation to each other.

At 208, each pixel can be classified according to color. Classifying each pixel according to color can utilize known measured values that correspond to one or more code values. A rendition of a "good black" is not required, as whatever rendition is produced by default is the rendition that is measured and later recognized. For small numbers of barcode (e.g. one or two bits per separation), measurements can be stored in a simple table and searched by linear means. For larger numbers of barcodes, a more sophisticated structure, such as an oct-tree, which is indexed by measurement values, can be built. The data structure is then searched for all close colors and the closest one of the list is identified when a barcode is to be decoded. In this manner, approximately three bits per separation may be printed and subsequently recognized with sufficiently acceptable reproducibility despite page to page and within page variability of the printer. In a preliminary step, all disparate colored barcodes within a single barcode are printed. These are then all measured and if any two adjacent colors are confusingly similar, one of those colors is eliminated, along with all other colors in which the illuminated color lies. Alternatively, the two colors can be replaced by the one that has a color that is an average value of the two.

At 210, pixel locations are set to pixel separation values for each of the colors present in the pixel. Pixel locations are set to white, at 212, for colors that are absent in the pixel. At 214, a barcode is extracted that correlates to each of the disparate colors detected. At reference numeral 216, each extracted barcode is median filtered and, at 218, each column in the extracted bar codes is reduced to a predetermined column average.

At 220, columns that have been extracted are replaced with the average column width for each of the extracted barcodes. At 222 each extracted barcode is read and decoded to determine the character string contained therein. In this manner, a single one-dimensional barcode space can store a substantially unlimited amount of information since the number of disparate barcodes is limited only by the number of disparate colors that can be separately identified by the RGB scanning device.

Figure 3:
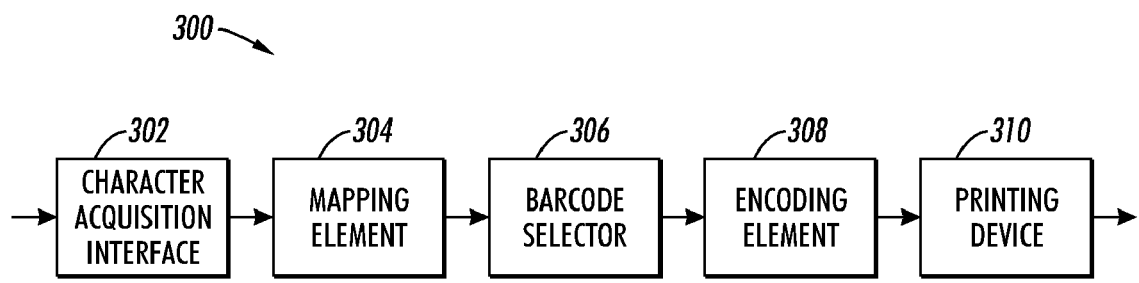
FIG. 3 is a system to create an overprint a multi-colored barcode, in accordance with an exemplary embodiment.

FIG. 3 is a system 300 utilized to overprint at least two disparate colored barcodes in a single location. A string creation interface 302 allows a user to enter a plurality of characters associated with particular information. A string creation interface 302 can be a computer, a processor or any component suitable to allow data entry and subsequent review. The string creation interface 302 interfaces with a symbology encoder 304 that accepts the string from the string creation interface and encodes the string into a predetermined symbology. The symbology utilized for encoding the character string can be selected by a user via the string creation interface and/or the symbology encoder 304.

The symbology encoder 304 can encode the character string from the string creation interface 302 by utilizing a color selection element 306 and a mapping element 308. The symbology encoder 304 can select appropriate colors and utilize suitable mapping based on a number of factors including barcode footprint size, marking standards, company protocols, etc. The color selection element allows the two or more bar codes to each be associated with a particular color. In one example, the color selection element identifies three disparate barcodes and assigns a first barcode with a color cyan, a second barcode with a color magenta, and a third barcode with a color yellow.

The mapping element 308 is employed to map the character string to a particular barcode such as a U.P.C., Codabar, Code 11, Code 93, Telepen, etc. In this manner, the symbology encoder 304 can accept the character string from the string creation interface 302, determine the number of characters contained within the string, associate the character string to a particular barcode via the mapping element 308 and assign two or more colors for the barcode via the color selection element 306.

Once the symbology encoder 304 has provided a suitable barcode and at least two or more disparate colors associated therewith, a printing device 310 places the barcode on a desired surface. The printing device 310 can be any suitable marking element capable of receiving and processing incoming data to mark a surface, such as paper, velum, or acetate. In one example, the printing device 310 utilizes a xerographic process.

Figure 4:
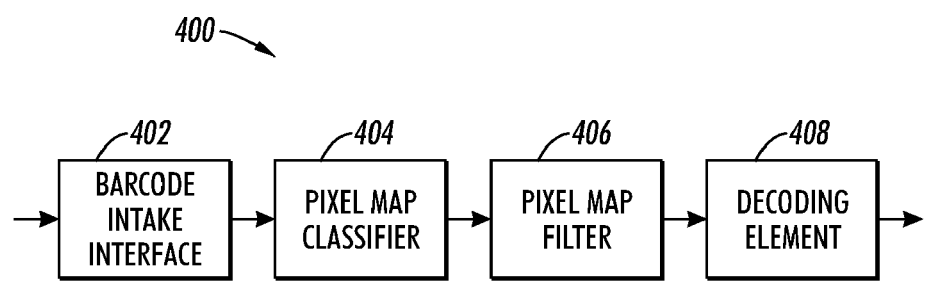
FIG. 4 is a system for reading and decoding a multi-colored barcode, in accordance with an exemplary embodiment.

FIG. 4 illustrates a system 400 that reads and decodes an overprinted one-dimensional bar code. In one example, the overprinted barcode is created as set forth in the system 300 above. A barcode intake interface 402 is utilized to read a barcode. In one example, the barcode is a one-dimensional barcode placed on a surface. The barcode intake interface 402 can be employed to read a barcode from a distance, wherein a scanner or a CCD camera is employed to obtain an RGB pixel map from the barcode. Since the overprinted barcode is comprised of a plurality of disparately colored barcodes, a pixel map is allocated by the barcode intake interface 402 for each of the colors detected.

A pixel map classifier 404 classifies the disparate barcodes within the overprinted barcode. Secondary buffers that contain colors that are present in the pixel have their corresponding pixel locations set to a pixel separation value that corresponds to each buffer's color. For instance, if the pixel is present in a cyan sep, the value of the red separation is stored in a secondary buffer (not shown). Secondary buffers that do not include colors present in the pixel have their corresponding pixel set to white to indicate that the color was not present. In this manner, the overprinted color barcodes are separated by the pixel map classifier 404 into a number of separate black and white barcodes that can be decoded.

Once classified, a pixel location identifier 406 identifies the location of each of the disparate colored bar codes within the overprinted barcode. The barcode extractor 408 extracts a barcode that correlates to each of the disparate colors detected within the overprinted barcode. The barcode filter 410 median filters each extracted barcode, wherein each column in the extracted bar codes is reduced to a predetermined column average. Columns that have been extracted are replaced with the average column width for each of the extracted barcodes. The decoding element receives this data from the barcode filter 410 and reads and decodes each extracted barcode to determine the character string contained therein. In this manner, a single one-dimensional barcode space can store a substantially unlimited amount of information since the number of disparate barcodes is limited only by the number of disparate colors that can be separately identified by the RGB scanning device.

Figure 5:
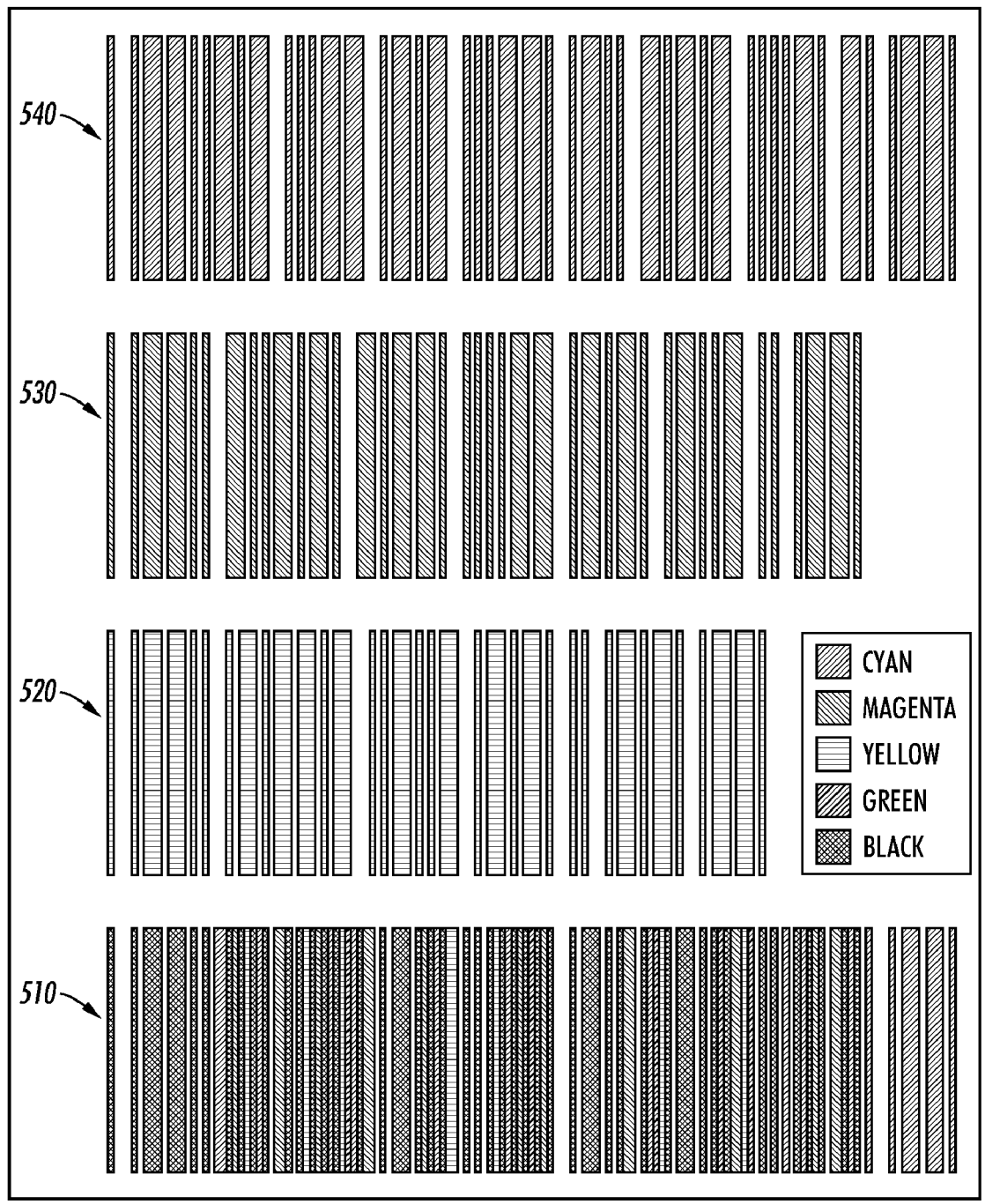
FIG. 5 illustrates a plurality of disparate colored barcodes, in accordance with an exemplary embodiment.

FIG. 5 illustrates an overprinted barcode 510. The overprinted barcode is a one-dimensional barcode that is comprised of three disparate barcodes 520, 530 and 540. The barcode 520 is yellow, the barcode 530 is magenta and the barcode 540 is blue. Each of the barcodes 520-540 contains data that is independent of data contained in each of the other two barcodes. Such information can include a text string representative of desired information.

The overprinted barcode 540 includes the barcodes 520, 530, and 540 that are printed in predetermined locations. In general, the direction in a vertical direction is substantially identical for the each of the colored barcodes. However, horizontal placement can be configured such that there is overlap of one or more of the barcodes 520-540 in some locations and no overlap in others. Each of the various color combinations that results from overprinting is designated in the barcode 510 and shown herein.

Figure 6:
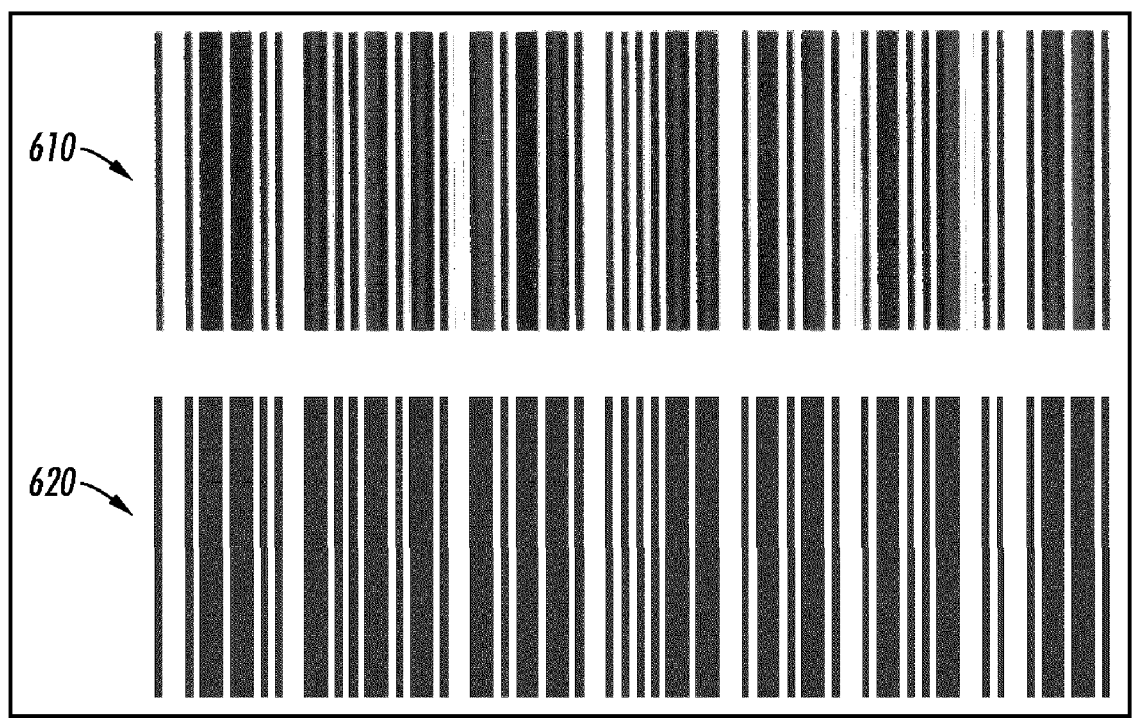
FIG. 6 illustrates an extracted barcode from a multi-colored barcode, in accordance with an exemplary embodiment.

FIG. 6 illustrates an exemplary barcode 610 that is a single color (e.g. magenta) extracted from the overprinted barcode 510. The barcode 610 is still in a noisy format as it has not gone through a suitable filtration process. The barcode 620, however, has been filtered via a barcode filter 410 and is suitable for appropriate decoding. A decoding element 412 is utilized to decode the clean barcodes, such as the barcode 620 utilizing conventional means. For example, the clean barcode 620 can be presented in a black and white format utilizing a UPC symbology. This process can be repeated for each of the disparate barcodes that have been extracted from the overprinted barcode 510. In this manner, all of the data stored within the overprinted barcode 510 is extracted and decoded and a factor of at least two in terms of storage can be employed to include more information within a single one dimensional barcode space.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method to read an overprinted color barcode, comprising:
   Obtaining a red, green and blue ("RGB") pixel map from an overprinted color barcode that contains a plurality of disparate colors in a one dimensional barcode space;
   allocating a pixel map for each of the colors detected;
   classifying each pixel in the one or more pixel maps according to color;
   extracting one or more barcodes from the overprinted color barcode that correlates to each color detected;
   filtering each of the extracted barcode utilizing a median process which reduces each column in the extracted barcodes to a column average and replaces each column with the average column width;
   decoding the filtered barcode; and
   reading the extracted barcode.

2. The method according to claim 1, wherein pixel locations are set to pixel separation value for colors present in the pixel.

3. The method according to claim 1, wherein pixel locations are set to white for colors absent in the pixel.

4. The method according to claim 1, wherein the red, green, and blue ("RGB") pixel map is obtained via one of a document scanner and a CCD camera.

5. The method according to claim 1, wherein the extracted barcodes are first converted into separate gray scale barcodes before they are decoded.

6. The method according to claim 1, wherein each of the two or more color barcodes extracted from the overprinted color barcode are separated into a plurality of black and white barcodes for decoding.

7. The method according to claim 1, wherein obtaining red, green, blue ("RGB") pixel map values from the overprinted color barcode utilizes calibration of a scanner by printing all of the colors in their possible overprint combinations, scanning them in, and obtaining the average RGB levels for each color and overprint combination.

8. The method according to claim 7, wherein classifying is utilized to obtain the red, green, blue ("RGB") value for a pixel, performs a search to find the calibrated colors RGB value that is the closest.

9. The method according to claim 1, wherein the color pixels in a column are replaced with an average of their RGB value and exceeding a threshold of fifty percent of a color of pixels in a column results in the replacement of the entire column of pixels with the same color to produce a clean barcode.

10. A system that decodes an overprinted color barcode, comprising:
    a barcode intake interface that receives a character string;
    a pixel map classifier that classifies pixels associated with the barcode created from the character string;
    a pixel location identifier that identifies the pixels classified by the pixel map classifier;
    a barcode extractor that extracts two or more disparate color barcodes from the overprinted color barcode;
    a barcode filter that filters each of the extracted barcodes from the overprinted color barcode to provide a black and white rendering of each extracted barcode utilizing a median process which reduces each column in the extracted barcodes to a column average and replaces each column with the average column width; and
    a decoding element that decodes the each of the barcodes extracted from the overprinted color barcode.

11. The system according to claim 10, wherein the overprinted color barcode consists of the colors cyan, yellow, and magenta.

12. The system according to claim 10, further including:
    a barcode reader that identifies the character strain contained within each of the extracted barcodes.

13. The system according to claim 10, further including:
    a device that organizes each of the extracted barcodes into a predetermined order in order to properly extract information contained there within each of the extracted barcodes.

14. The system according to claim 10, wherein the barcode received by the barcode intake interface is a one dimensional barcode.

15. The system according to claim 10, wherein the pixel map classifier is one of a CCD camera and a document scanner.

* * * * *